United States Patent
Androulaki et al.

(10) Patent No.: US 11,093,558 B2
(45) Date of Patent: Aug. 17, 2021

(54) PROVIDING ACCOUNTABILITY OF BLOCKCHAIN QUERIES

(71) Applicant: International Business Machines Corporation, Armonk, NY (US)

(72) Inventors: Elli Androulaki, Zürich (CH); Angelo De Caro, Zürich (CH); Fabian Portmann, Zürich (CH); Alessandro Sorniotti, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 15/812,683

(22) Filed: Nov. 14, 2017

(65) Prior Publication Data
US 2019/0147106 A1 May 16, 2019

(51) Int. Cl.
*G06F 16/00* (2019.01)
*G06F 16/951* (2019.01)
*H04L 9/32* (2006.01)
*H04L 9/06* (2006.01)
*G06F 16/9038* (2019.01)
*G06F 16/903* (2019.01)
*G06F 16/901* (2019.01)
*G06F 16/13* (2019.01)

(52) U.S. Cl.
CPC .......... *G06F 16/951* (2019.01); *G06F 16/137* (2019.01); *G06F 16/9024* (2019.01); *G06F 16/9038* (2019.01); *G06F 16/90335* (2019.01); *H04L 9/0637* (2013.01); *H04L 9/3226* (2013.01); *H04L 9/3239* (2013.01); *H04L 2209/38* (2013.01)

(58) Field of Classification Search
CPC ...................................................... G06F 16/137
See application file for complete search history.

(56) References Cited

U.S. PATENT DOCUMENTS

| | | |
|---|---|---|
| 2016/0283920 A1 | 9/2016 | Fisher et al. |
| 2016/0292672 A1 | 10/2016 | Fay et al. |
| 2017/0132625 A1 | 5/2017 | Kennedy |
| 2017/0132626 A1 | 5/2017 | Kennedy |
| 2017/0155515 A1 | 6/2017 | Androulaki et al. |
| 2017/0236123 A1* | 8/2017 | Ali ..................... G06Q 20/3825 705/75 |
| 2018/0337770 A1* | 11/2018 | Bathen .................. H04L 9/3239 |

OTHER PUBLICATIONS

S. King, and S. Nadal, PPCoin: Peer-to-Peer Crypto-Currency with Proof-of-Stake, Aug. 19, 201. Retrieved from internet: http://peerco.in/assets/paper/peercoin-paper.pdf.
C. Christian, Architecture of the Hyperledger Blockchain Fabric, IBM Research—Zurich, Jul. 2016. Retrieved from internet using: https://pdfs.semanticscholar.org/f852/c5f3fe649f8a17ded391df0796677a59927f.pdf.
Blockchain—A forward step to secure transaction. Retrieved from internet using: http://blog.ifourtechnolab.com/post/2016/10/04/blockchain-a-forward-step-to-secure-transaction.
Blockchain—Wikipedia. Wikipedia, The Free Encyclopedia, date of last revision: Jul. 1, 2017. Retrieved from Internet using: https://en.wikipedia.org/w/index.php?title=Blockchain.

* cited by examiner

*Primary Examiner* — Ajith Jacob

(57) ABSTRACT

An example operation may include one or more of identifying a query from a client device to locate blockchain data stored in a blockchain, performing the query and storing a query result outside the blockchain, and transmitting a query response message to the client device including a hash of the query result data.

20 Claims, 6 Drawing Sheets

PROVIDING ACCOUNTABILITY OF BLOCKCHAIN QUERIES

TECHNICAL FIELD

This application generally relates to ensuring accountability and/or recordation of blockchain access attempts and more particularly to providing accountability of blockchain queries.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Certain blockchain configurations permit queries, such as chaincode queries to identify certain information and other related operations. Blockchain queries are a sub-procedure which does not often have a recordation or other type of evidence maintained to identify the existence of those and similar types of blockchain access operations. In many cases, the record of such an event is necessary for preserving blockchain accountability for various different reasons. In such circumstances, a non-conventional approach to ensuring a blockchain maintains a record of those queries and related operations may be necessary to maintain accurate access records.

Whenever accountability of the queries is required, the transactor is free to turn the query into a transaction. However, this is only possible in cases where the security model guarantees that the transactor is honest or has an incentive to submit the query as a transaction. In many cases, however, this is not true, the transactor may be malicious and when receiving access to data in a blockchain, is free to drop the message and not submit the actions as a transaction in a blockchain. Later, if and when a dispute arises, the transactor can always claim that they have never received data, and the blockchain, which is devised for the very purpose of settling this kind of dispute, has no record of the information related to the transactor. There are certain instances where blockchain related matters (i.e., access) should be written to the ledger even outside of the more traditional transaction types.

SUMMARY

One example embodiment may provide a method of operation which includes one or more of identifying a query from a client device to locate blockchain data stored in a blockchain, performing the query and storing a query result data outside the blockchain, and transmitting a query response message to the client device comprising a hash of the query result data.

Another example embodiment may include an apparatus that includes a processor configured to perform one or more of identify a query from a client device to locate blockchain data stored in a blockchain, perform the query and storing a query result data outside the blockchain, and a transmitter configured to transmit a query response message to the client device comprising a hash of the query result data.

Still another example embodiment may include a non-transitory computer readable storage medium configured to store instructions that when executed cause a processor to perform one or more of identifying a query from a client device to locate blockchain data stored in a blockchain, performing the query and storing a query result data outside the blockchain, and transmitting a query response message to the client device comprising a hash of the query result data.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to ensuring accountability and/or recordation of blockchain access attempts, and in another embodiment relates to providing accountability of blockchain queries.

Another embodiment relates to a mechanism that permits queries on a blockchain platform to be identified and recorded even though such queries are not necessarily identified as normal transactional data which would normally be committed to the blockchain. By creating a record of such queries, the blockchain integrity may be preserved for more than just ordinary transaction data.

Figure 1:
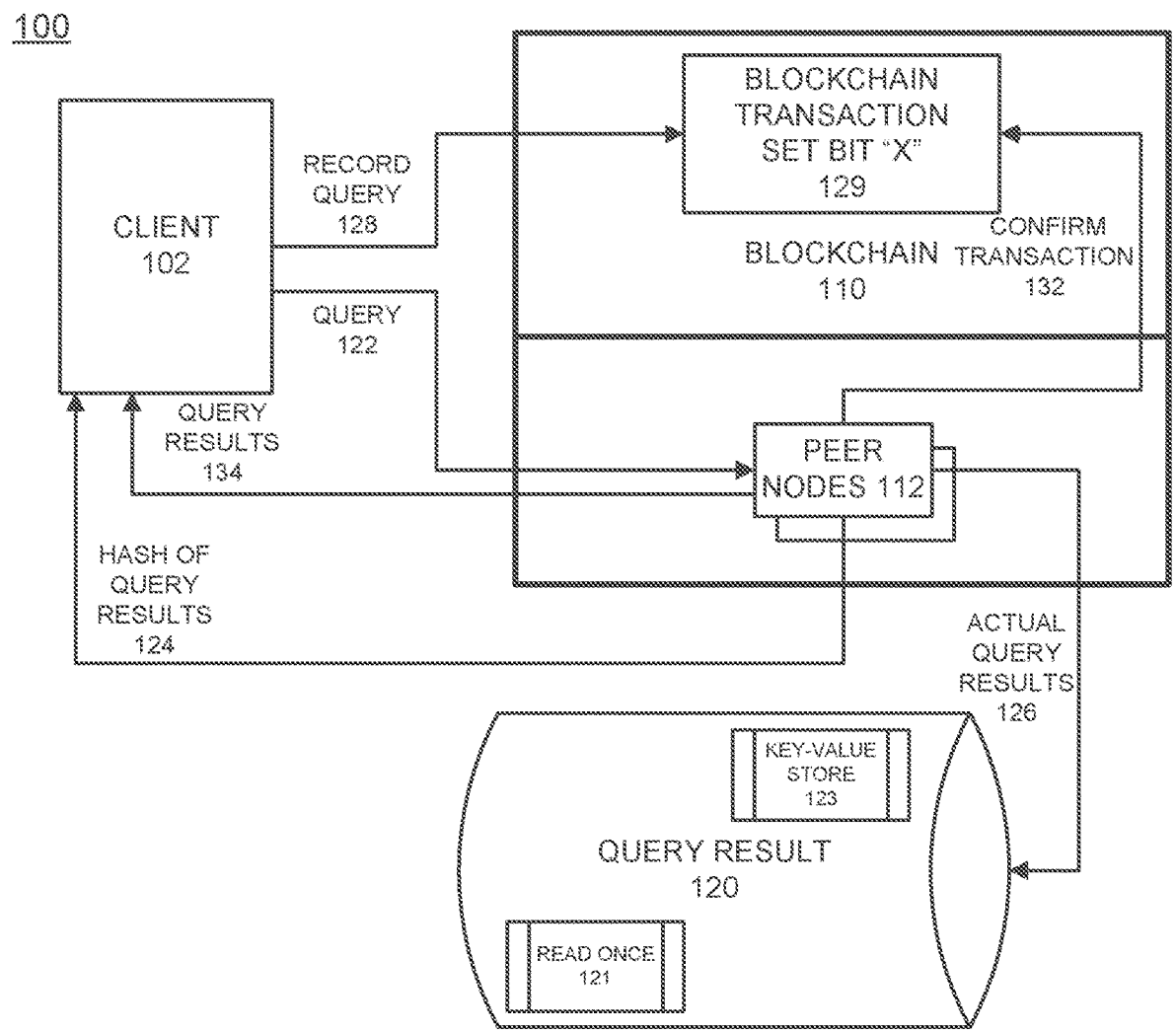
FIG. 1 illustrates a logic diagram of processing a query and establishing accountability via a blockchain, according to example embodiments.

FIG. 1 illustrates a logic diagram of processing a query and establishing accountability via a blockchain, according to example embodiments. Referring to FIG. 1, the configuration 100 includes a client device 102 communicating with a blockchain 110 to perform a query 122 on one or more of the blockchain's transaction records. The example procedure begins with a query 122 for such information being stored in the blockchain 110. The peer nodes 112 are responsible for managing access control functions, such as the present query request. The peer nodes 112 may identify the query 122 and perform a query on the blockchain 110. The results are not returned to the client 102 without evidence of a transaction recording the query attempt. For example, the peer nodes 112 may store the query results 120 in an off-blockchain memory location. The memory may have functions setup to perform a key-value store function 123 for security purposes and a one-time read access function 121, which deletes the actual query data 126 once the read once event 121 is invoked. Such an event may be invoked by a peer when it is determined the client 102 has submitted a transaction to the blockchain 110, indicative of the query event. Prior to the query results being forwarded to the client 102, a hash of the query results 124 is performed and sent to the client 102. The client 102 may then submit a blockchain transaction with a record of the query 128 and which has a bit 'X' 129 set to identify the original query. At some point, one or more peer nodes 112 may identify the transaction and confirm its existence 132 and the fact that the transaction identifies details of the original query. Once this transaction is confirmed, the actual query results 134 may be forwarded to the client 102.

A chaincode, also sometimes referred to as smart contract, is a computer program that runs in the distributed operating environment provided by the blockchain system. A chaincode can embed any business logic, from the negotiation of insurance contracts, procurement processes, etc., to the exchanges over a supply-chain or business network to the transfers of assets. A chaincode invocation is basically a request message sent to the chaincode to perform an operation. For instance, if the chaincode embeds the logic of negotiating contracts, an invocation may be a request to start a new negotiation, or to resume and terminate a previously instantiated contract. A query may be an invocation of a chaincode that is "read-only". A normal invocation may change the state of the blockchain system, but a read-only invocation does not make actual changes, instead the query type of invocation only returns some function of the existing state, leaving it untouched and unmodified.

A transaction proposal is a message that triggers an execution of a chaincode. For instance, a remote function call or remote procedure call may be transaction proposal, which is triggered by a message. The invoked function may be read-only (i.e., a query) or may write to the system state, which would make it a regular transaction type. The system state, world state or state of the system are all terms used to identify all information written to the ledger. The system state starts empty (no blocks in the ledger) and grows and changes over time as more blocks are committed to the ledger. A normal transaction is eventually committed to the ledger since it usually changes its state. A query does not change the state of the system, and so there is no reason to actually commit it to the ledger. One concern with auditing is that when a read-only query is not committed to the ledger then there is no trace of the query on the ledger, and thus there can't be any accountability even in a non-changing type of transaction, such as the query itself. For example, if a read-only function (query) on a chaincode is invoked then it retrieves the response, learns, and discards the function and corresponding data. In this example, there is no trace of this query action every happening. Later on, in a dispute, the query submitting party can always deny having performed that query, and there is no information on the ledger to disprove the party's assertions.

A proposal response is a result of the chaincode invocation, for example, a remote function call or remote procedure call that would be the result sent back to the initial invoker. Normal queries conventionally send the whole result not just a hash of the result. This approach of only using the hash is one example approach according to example embodiments. A key-value store can be modeled as follows: err←PUT(key, value). This function permits a user to associate the byte array "value" to the string "key" value; and ←GET(key) is a function which permits the retrieval of the byte array associated to the string "key". As a result, being indexed by a hash implies that a call to PUT(H(result), result) will result.

A read once property implies that the query result data is deleted after the hash is decrypted with a key. This feature of the system amounts to requiring that the GET function deletes the value associated with the key after returning the value. In operation, a client submits a query, receives the hash and then submits a transaction to the blockchain with the bit set. The peers (one or more) may observe the bit, and this triggers the query data being decrypted/retrieved so the peer would observe the bit and the hash. The peer would then query the internal read-once key value store, issue a get(hash) and return the value. The read-once properties of this function would ensure that a subsequent call to get (hash) would return no data. A lookup key in a key-value store may provide an argument to get and the first argument to put. In one example, an associative array associates something, such as the key string to something else (i.e., the value) so that the value can be retrieved by providing the key string. In this example, the lookup key is the hash value, and the peer receives a transaction that is committed to the ledger with the bit set and a hash. Then the peer can perform the lookup in the internal key-value storage, using the hash as the lookup key to retrieve the associated value.

Figure 2:
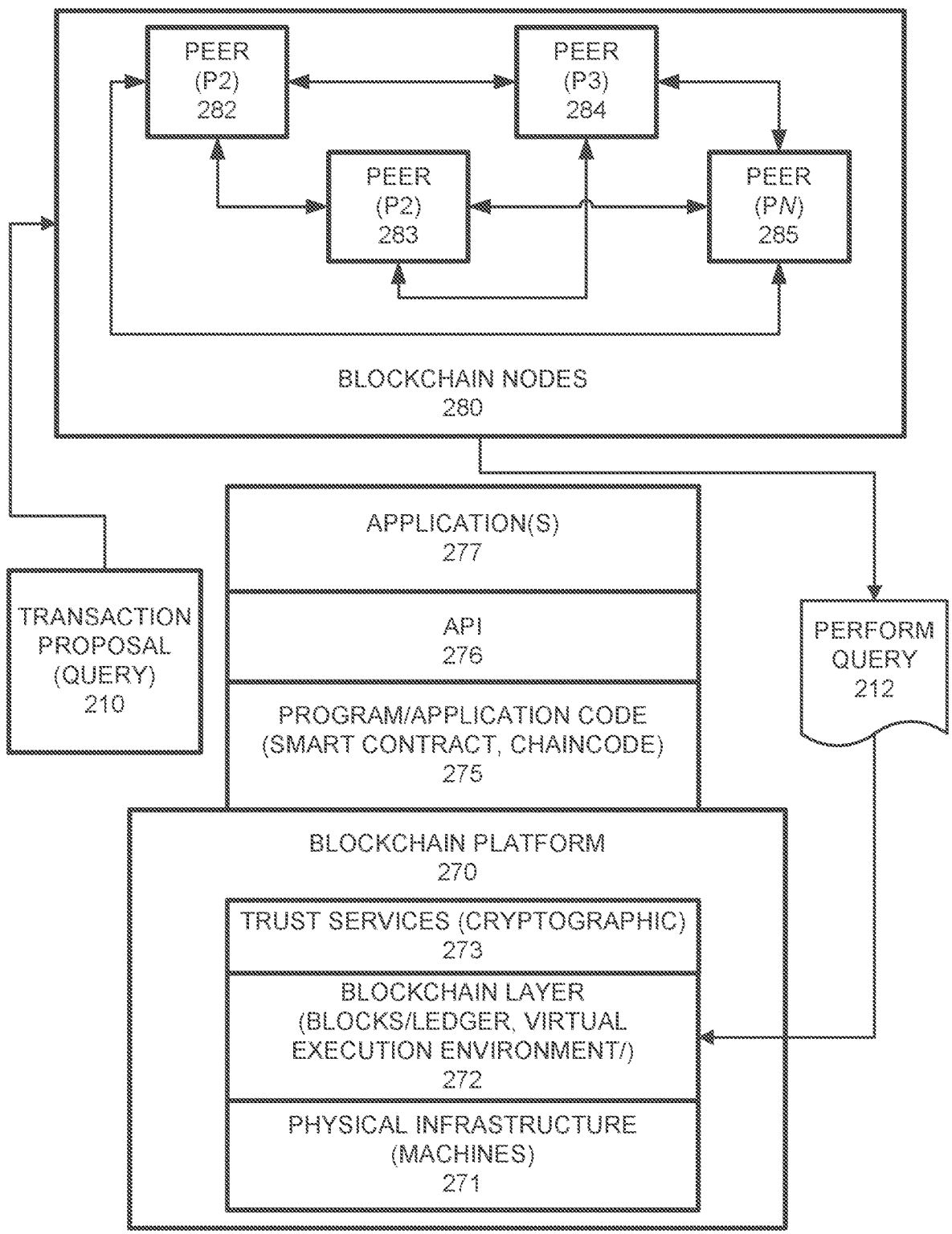
FIG. 2 illustrates an example blockchain configuration for performing query accountability, according to example embodiments.

FIG. 2 illustrates an example blockchain configuration for performing the query authentication and accountability function, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

As described herein, a smart contract is an executable code which is registered, stored, and replicated with a blockchain (e.g., distributed network of blockchain peers). A transaction is an execution of the smart contract code which can be performed in response to conditions associated with the smart contract being satisfied. The executing of the smart contract may trigger a trusted modification to a state of a digital blockchain ledger. The modification to the blockchain ledger caused by the smart contract execution may be automatically replicated throughout the distributed network of blockchain peers through one or more consensus protocols.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, the query 210 is identified as being sent from the client device, which may be processed by one or more processing entities (virtual machines) in the blockchain execution layer 272. The result may include access to such query information being granted to the client device entity/application from the blockchain computing environment (VM). In this example, query 212 is performed by the peer node(s) to reference information stored in the blockchain 270. The physical machines 271 may be accessed to retrieve the customer information which can then be decrypted by the anonymous and authorized third parties/clients.

Figure 3:
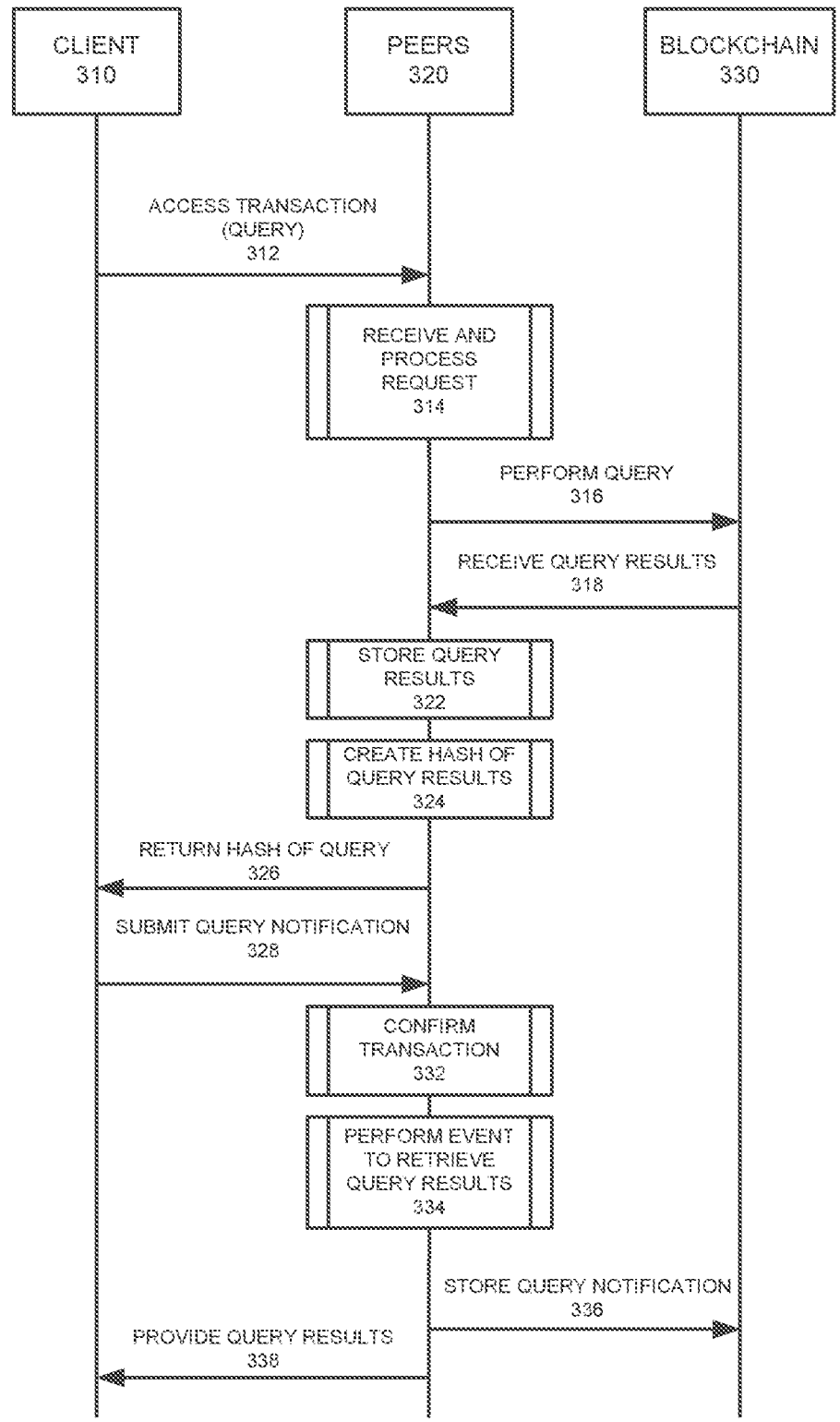
FIG. 3 illustrates a system messaging diagram for processing a request for blockchain access and establishing accountability, according to example embodiments.

FIG. 3 illustrates a system messaging diagram for processing a request for blockchain access and establishing accountability, according to example embodiments. Referring to FIG. 3, the system 300 provides a client device 310, such as a third party, privileged blockchain user device, etc. The peers 320 of the blockchain 330 are responsible for receiving the access transaction message/request for information 312, which may include a query or other request for information. The peer(s) 320 may receive and process the request 314 by submitting a query 316 to the blockchain data sought by the request. The query results 318 are returned to the peer and stored in an off-blockchain memory 322. Once the data is secured, the hash of the data may be generated 324 and sent 326 to the client 310, which now has a trigger and/or response/reason to submit the query transaction 328 with the details of the query, such as date, parties, time, purpose, information sought, etc. The transaction is then confirmed 332 by the peers as being written and stored 336 in the blockchain 330. The peer may use the evidence of transaction as a trigger to retrieve the actual query results 334 and forward 338 them to the client 310.

Figure 4A:
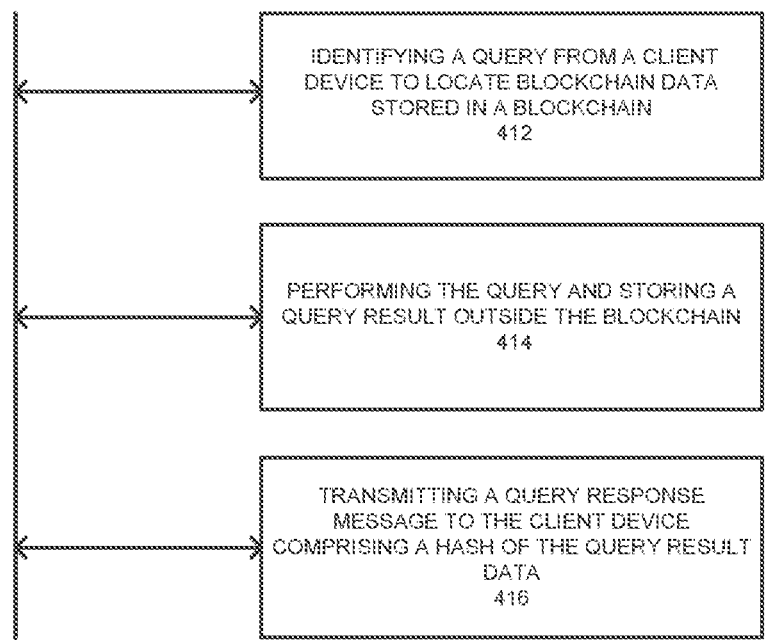
FIG. 4A illustrates a flow diagram of an example method of managing query requests, according to example embodiments.

FIG. 4A illustrates a flow diagram of an example method of managing query requests, according to example embodiments. The method 400 may include identifying a query from a client device to locate blockchain data stored in a blockchain 412, performing the query and storing a query result outside the blockchain 414, and transmitting a query response message to the client device including a hash of the query result data 416. The query may include a chaincode invocation. The query result data is indexed via one or more blockchain peers and is indexed based on the hash of the query result data. The method may also include deleting the query result data after an identified access attempt via one or more of the blockchain peers. The method may also include receiving a transaction identifying the query from the client device, and the transaction may include a bit notifying blockchain peers that the transaction will be committed. Responsive to identifying the bit, the query result data is retrieved and a key is applied to access the query result data, and the query result data is forwarded to the client device.

Figure 4B:
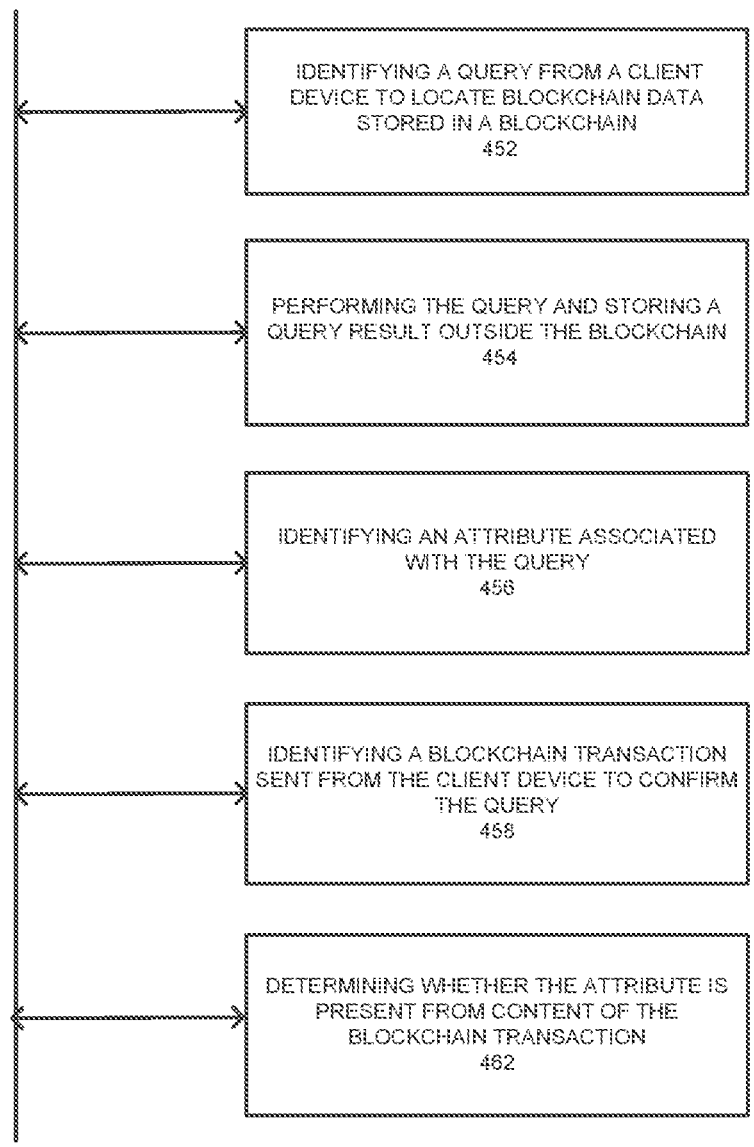
FIG. 4B illustrates another flow diagram of an example method of managing query requests, according to example embodiments.

FIG. 4B illustrates another flow diagram of an example method of managing query requests, according to example embodiments. The method 450 may include identifying a query from a client device to locate blockchain data stored in a blockchain 452, performing the query and storing a query result outside the blockchain 454, identifying an attribute associated with the query 456. Identifying a blockchain transaction sent from the client device to confirm the query 458 and determining whether the attribute is present from content of the blockchain transaction 462.

In this example, when submitting the blockchain transaction, instead of just a single bit of data that can be identified by the peers as a basis to confirm the transaction and then release the query data, the transaction may include certain information 'attributes' that the peers can easily verify, such as a codeword, timestamp, virtual fingerprint, device address or other information. This ensures the transaction is not falsifying information that identifies the party seeking access to the query results but instead is offering information which must be verified against known data identified by the peer nodes and stored in a temporary memory during the initial request for the query data phase of this example procedure. Then, when the transaction is submitted to the blockchain for commitment and as evidence that the client should now receive the query results, the transaction data can be easily parsed/identified to verify the client device identity as the actual original client.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
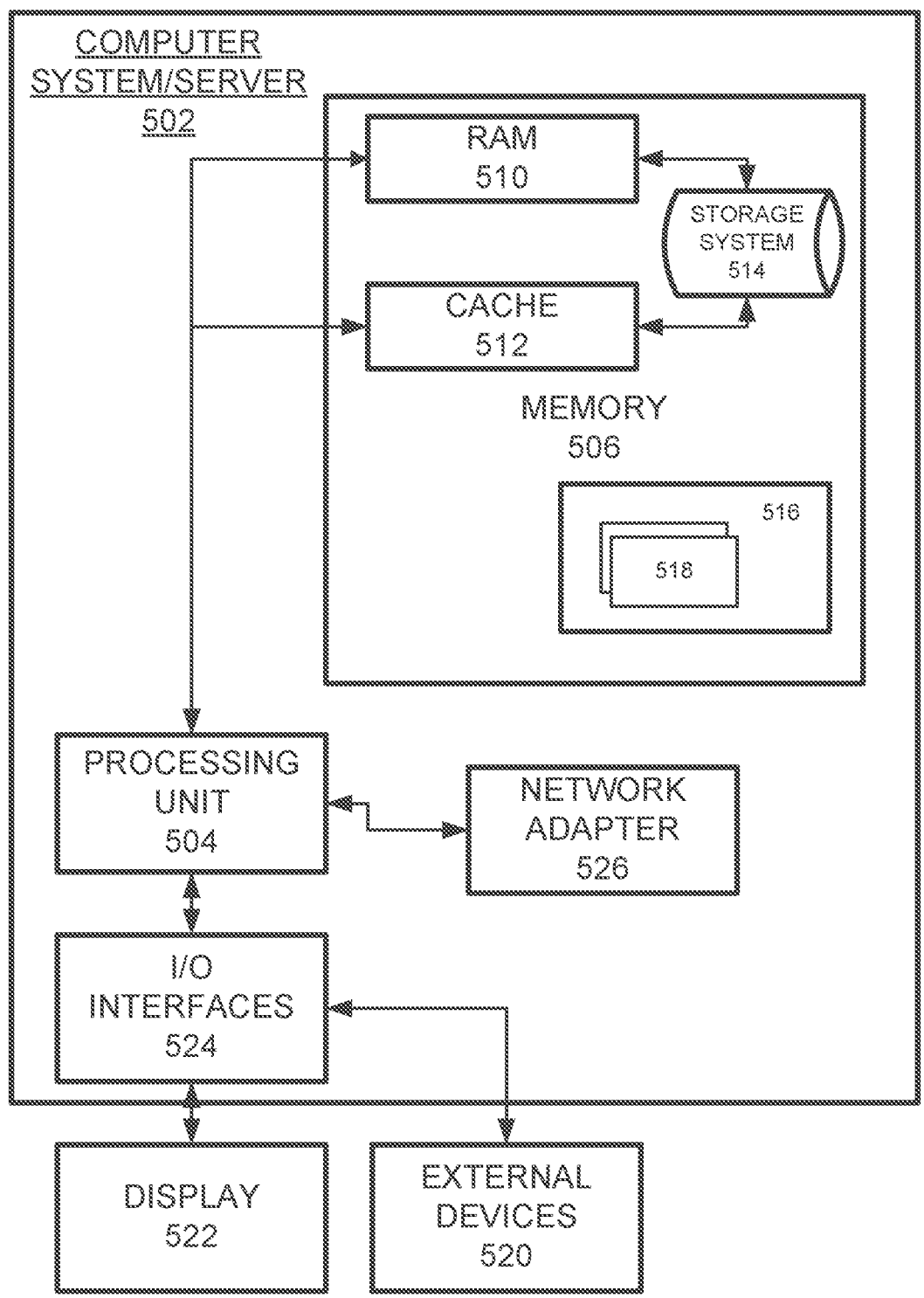
FIG. 5 illustrates an example network entity configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the various examples of the disclosed embodiments. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying, by one or more peer nodes of a blockchain network, a query from a client device to locate blockchain data stored in a blockchain;
    submitting, by the one or more peer nodes, the query to the blockchain;
    receiving, by the one or more peer nodes, a query result in response to the query;
    storing, by the one or more peer nodes, the query result in a memory outside of the blockchain;
    transmitting, by the one or more peer nodes, a hash of the query result to the client device;
    receiving, by the one or more peer nodes, a transaction from the client device, the transaction containing details of the query; and
    sending, by the one or more peer nodes, the query result to the client device in response to the one or more peer nodes confirming that the transaction is to be committed to the blockchain.

2. The method of claim 1, wherein the query comprises a chaincode invocation.

3. The method of claim 1, further comprising:
    indexing the query result by the one or more peer nodes.

4. The method of claim 1, wherein the indexing the query result is based on the hash of the query result.

5. The method of claim 3, further comprising:
    deleting the query result after an identified access attempt by the one or more peer nodes.

6. The method of claim 1, wherein the one or more peer nodes confirming that the transaction is to be committed to the blockchain comprises further:
    identifying that the transaction comprises a bit identifying the query.

7. The method of claim 6, further comprising:
    responsive to identifying the bit, retrieving the query result;
    applying a key to access the query result; and
    forwarding the query result to the client device.

8. One or more peer nodes of a blockchain network, the one or more peer nodes each, comprising:
    a processor configured to:
        identify a query from a client device to locate blockchain data stored in a blockchain;
        submit the query to the blockchain;
        receive a query result in response to the query;

store the query result in a memory outside of the blockchain;

send a hash of the query result to the client device;

receive a transaction from the client device, the transaction containing details of the query; and send the query result to the client device in response to the one or more peer nodes a confirmation that the transaction is to be committed to the blockchain.

9. The apparatus of claim 8, wherein the query comprises a chaincode invocation.

10. The apparatus of claim 8, wherein the processor is further configured to:

index the query result.

11. The apparatus of claim 8, wherein, when the processor is configured to index the query result, the processor is further configured to:

index the query result based on the hash of the query result data.

12. The apparatus of claim 10, wherein the processor is further configured to:

delete the query result after an identified access attempt by the one or more peer nodes.

13. The apparatus of claim 8, wherein, when the processor is configured to confirm that the transaction is to be committed to the blockchain, the processor is further configured to:

identify that the transaction comprises a bit identifying the query.

14. The apparatus of claim 13, wherein the processor is further configured to:

responsive to the identification of the bit, retrieve the query result;

apply a key to access the query result; and forward the query result to the client device.

15. A non-transitory computer readable storage medium configured to store one or more instructions that when executed by a processor of one or more peer nodes of a blockchain network configure the processor to perform:

identifying a query from a client device to locate blockchain data stored in a blockchain;

submitting the query to the blockchain;

receiving a query result in response to the query;

storing the query result in a memory outside of the blockchain;

transmitting a hash of the query result to the client device;

receiving a transaction from the client device, the transaction containing details of the query; and sending the query result to the client device in response to the one or more peer nodes confirming that the transaction is to be committed to the blockchain.

16. The non-transitory computer readable storage medium of claim 15, wherein the query comprises a chaincode invocation.

17. The non-transitory computer readable storage medium of claim 15, wherein the one or more instructions further configure the processor to perform:

indexing the query result.

18. The non-transitory computer readable storage medium of claim 15, wherein the indexing the query result is based on the hash of the query result.

19. The non-transitory computer readable storage medium of claim 17, wherein the one or more instructions further to configure the processor to perform:

deleting the query result after an identified access attempt by the one or more peer nodes.

20. The non-transitory computer readable storage medium of claim 15, wherein, when the processor is configured to perform confirming that the transaction is to be committed to the blockchain, the processor is further configured to perform:

identifying that the transaction comprises a bit identifying the query, and wherein the one or more instructions further configure the processor to perform:

responsive to identifying the bit, retrieving the query result;

applying a key to access the query result; and forwarding the query result to the client device.

\* \* \* \* \*